United States Patent [19]
Mizumoto

[11] Patent Number: 6,160,959
[45] Date of Patent: Dec. 12, 2000

[54] EQUIPMENT WITH SHAKE SENSING FUNCTION

[75] Inventor: Kenji Mizumoto, Osaka, Japan

[73] Assignee: Minolta Co., Ltd., Osaka, Japan

[21] Appl. No.: 09/296,449

[22] Filed: Apr. 21, 1999

[30] Foreign Application Priority Data

Apr. 28, 1998 [JP] Japan .................................. 10-118587

[51] Int. Cl.$^7$ .................................................. G03B 17/00
[52] U.S. Cl. ................................................ 396/55; 396/52
[58] Field of Search ................................ 396/52, 53, 54, 396/55; 348/208

[56] References Cited

U.S. PATENT DOCUMENTS

| | | | |
|---|---|---|---|
| 5,678,070 | 10/1997 | Kai | 396/55 |
| 5,768,634 | 6/1998 | Nagai et al. | 396/54 |
| 5,771,069 | 6/1998 | Kobayashi | 396/55 |
| 5,805,212 | 9/1998 | Fujiwara | 396/52 |

*Primary Examiner*—Russell Adams
*Attorney, Agent, or Firm*—Sidley & Austin

[57] ABSTRACT

In a shake correctable apparatus, beat signals generated by interference of a mechanical vibration having a frequency fg due to a excitation of an angular velocity sensing portion of an angular velocity sensor and a mechanical vibration having a frequency fp due to a driving of a driving device are removed from an output signal of the angular velocity sensor by a filtering operation of a low-pass filter or a band-pass filter. The frequencies fg and fp have a relation of $fc < |m \cdot fg - n \cdot fp|$ with respect to a cutoff frequency fc of the filter in high frequency side.

14 Claims, 7 Drawing Sheets

FREQUENCY

EQUIPMENT WITH SHAKE SENSING FUNCTION

This application is based on patent application Hei.10-118587 filed in Japan, the contents of which are hereby incorporated by references.

BACKGROUND OF THE INVENTION

1. Field of the Invention

This invention relates to an equipment with shake sensing function such as a shake sensor, an apparatus with shake sensor and an equipment with shake correction apparatus such as a camera or a binocular, and so on.

2. Description of the Related Art

This type of equipment is described below by taking a camera as an example of the equipment with shake sensing function.

In a known shake correction apparatus used in the camera, a shake of a lens barrel or a camera body due to unintentional hand movement (camera shake) is detected by, for example, two angular velocity sensors respectively sensing angular velocities in two different directions. Undesirable high frequency noise component, drift, offset and so on are removed from angular velocity signals of the angular velocity sensors by a filtering operation. The angular velocity signals are integrated so as to be converted to signals corresponding to angles (hereinafter abbreviated as angular signals).

In order to reduce or cancel movement of an image on a film plane or on an image pickup device due to the camera shake, a correction lens is moved in a manner so that the optical axis of the correction lens is decentered in a direction perpendicular to the optical axis of the taking lens. Hereinafter, the movement of the image on the film plane is called "quantity of the shake". For calculating moving quantities of the correction lens or for deciding destination of the correction lens to be moved, the levels of the angular velocity signals are adjusted so as to be converted to corrected position control signals. The position of the correction lens is detected by position sensor(s).

When the driving device is driven, mechanical vibrations are transmitted to the correction lens. In the case of using an ultrasonic motor as the driving device, a stator in a rotary motor or a driving shaft in a linear motor is excitingly vibrated by driving signals having a frequency fp (hereinafter, called driving frequency fp). Thus, mechanical vibration having the same frequency as the driving frequency fp occurs in the correction lens, and so on.

In the angular velocity sensor, an excitation pulse generator generates excitation pulse signals having a predetermined frequency fg (hereinafter, called excitation frequency fg) which is generally in the ultrasonic region. A piezoelectric device is driven by the excitation pulse signals for excitingly vibrating an angular velocity detecting portion with the excitation frequency fg. The angular velocity sensor senses the angular velocity of the camera shake by using Coriolis force generated by an excitation velocity and a rotation component of the camera shake.

With respect to the filtering operation of the output signals of the angular velocity sensors, in order to cutoff noise signals having a fundamental frequency and harmonics of the excitation frequency fg of the angular velocity sensors and the driving frequency fp of the driving device, a cutoff frequency fc of a band-pass filter in the high frequency side is selected to satisfy the relations of fc<fp and fc<fg.

In the typical shake correction apparatus, the angular velocity sensors are provided in the vicinity of the correction lens and the driving device. When a mechanical vibration having the excitation frequency fg generated by the exciting vibration of the angular velocity sensing portion of the angular velocity sensor interferes with a mechanical vibration having the driving frequency fp generated by the driving of the driving device (cross modulation phenomenon), beat signals having frequencies fb newly occur further to the detection signals corresponding to the angular velocity component of the shake. Since the beat signals are superimposed on the actual detection signals of the shake, they cause a reduction in the output signals of the angular velocity sensors. The frequencies fb of the beat signals are generally defined by the following equation (1).

$$fb = |m \cdot fg \pm n \cdot fp| \qquad (1)$$

Hereupon, the symbols m and n are respectively zeros or optional positive integers which never be zeros at the same time. When $m \geq 1$ and $n \geq 1$, the symbols m and n respectively designate the orders of the fundamental frequency or the harmonic of the vibrations having the frequencies fg and fp. The beat signals having the frequencies fb which are equal to or larger than the cutoff frequency fc of the band-pass filter in the high frequency side or the cutoff frequency fc of the low-pass filter can be removed by the filtering operation.

The conventional shake correction apparatus, however, is not considered to remove the beat signals by the filter. Thus, when the frequencies fb of the beat signals are smaller than the cutoff frequency fc of the filter, the beat signals cannot be removed by the filtering operation. The reduction of the S/N of the output signals of the angular velocity sensors due to the beat signals can never be improved. The reduction of the S/N of the output signals of the angular velocity sensors due to the beat signals occurs not only when the ultrasonic motors are used as the driving devices, but also when DC motors, voice coil motors or stepping motors are driven by pulse modulation drive such as PWM control (hereupon, the frequency of the pulse signals is assumed to be fp).

SUMMARY OF THE INVENTION

An object of this invention is to provide an equipment with shake sensing function such as a shake sensor, an equipment with shake sensor and an equipment with shake correction apparatus, in which the beat signals generated by the interference of the vibration having the driving frequency fp of the driving device and the vibration having the excitation frequency fg of the angular velocity sensors can be removed in order to prevent the reduction of the S/N of the output signals of the angular velocity sensors.

An equipment with shake correction apparatus in accordance with one aspect of the present invention comprises at least one set of an angular velocity sensor for sensing an angular velocity due to a shake by using Coriolis force, a filter including a low-pass filter or a band-pass filter for filtering an output signal of the angular velocity sensor, and a driving device for driving a correction lens system for canceling the image movement corresponding to the angular velocity. A frequency fg of an excitation signal for excitingly vibrating an angular velocity detecting portion of the angular velocity sensor, a fundamental frequency fp of mechanical vibrations generated by driving of the driving device, and a cutoff frequency fc of the low-pass filter or a cutoff frequency of the band-pass filter in high frequency side satisfy a relation $fc < |m \cdot fg - n \cdot fp|$. Hereupon, symbols m and n are respectively optional positive integers equal to or larger than one. When each symbols m or n is equal to or larger than two, it designates the orders of the harmonics of the frequency fg or fp.

Since the frequencies fg, fp and fc satisfy the above-mentioned relation, the frequencies fb of beat signals generated by interference of a mechanical vibration having the excitation frequency fg due to the vibration of the angular velocity detecting portion of the angular velocity sensor with a mechanical vibration having the driving frequency fp due to the driving device become equal to or larger than the cutoff frequency fc of the filter. Thus, the beat signals can be removed as high frequency noise by the filtering operation of the filter. As a result, the signal passing through the filter includes no noise component due to the beat signals, so that the S/N of the output signal of the angular velocity sensor may not be decreased by the noise component of the beat signals.

DETAILED DESCRIPTION OF THE EMBODIMENT

An embodiment of an equipment with shake correction apparatus in accordance with this invention is described.

Figure 1:
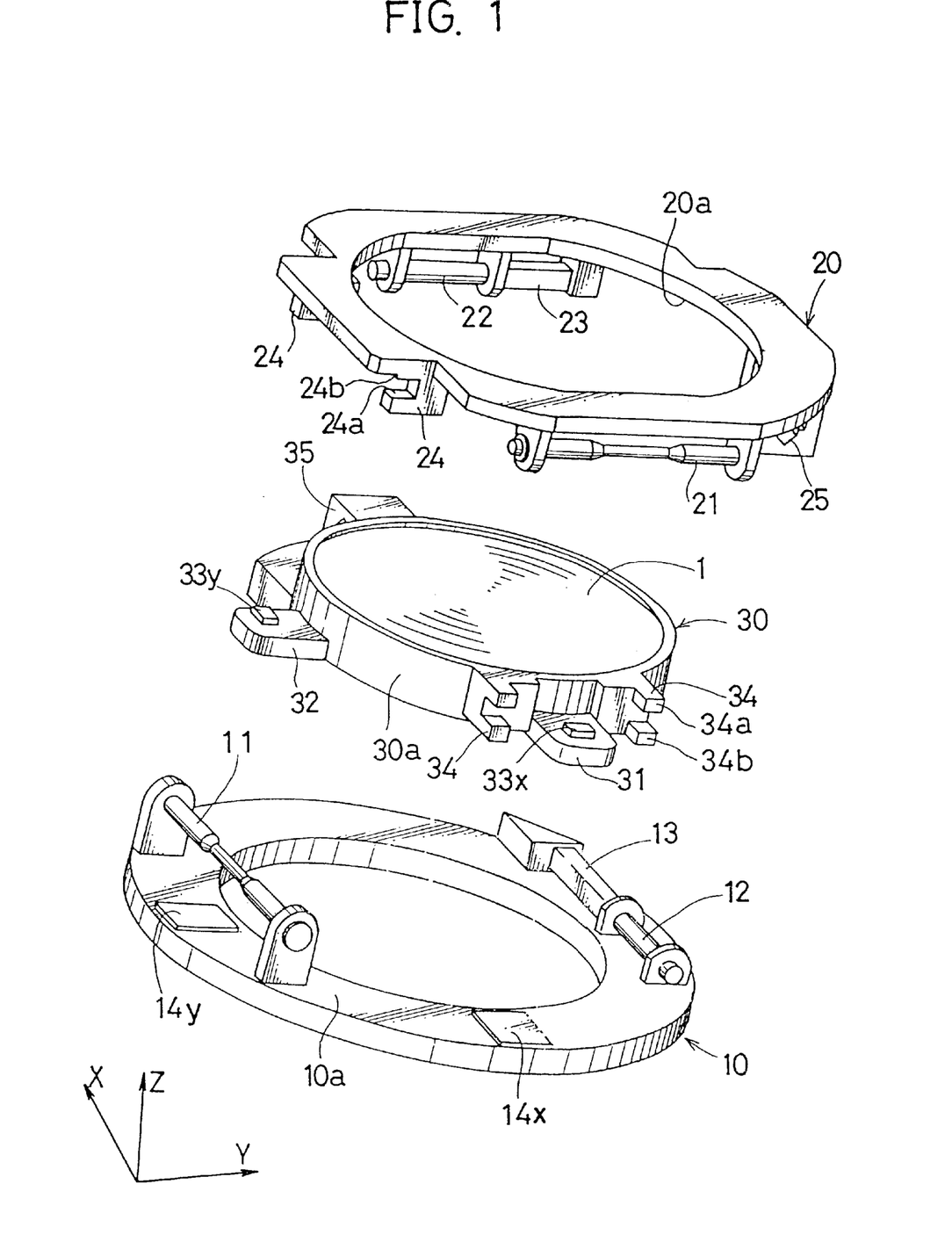
FIG. 1 is an exploded perspective view of a correction lens unit of an embodiment of an equipment with shake correction apparatus in accordance with this invention.

FIG. 1 shows a configuration of a correction lens unit which is provided in a taking lens system of an equipment, that is, a camera. A trailing shaft 11 and a driving shaft 12 are provided on a table face 10a of a secured frame 10 for movably holding a moving frame 20 in a first detection (X-direction shown by a symbol X) and substantially parallel to the table face 10 a of the secured frame 10. A piezoelectric device 13 serving as an actuator in the X-direction is connected with the driving shaft 12.

Similarly, a trailing shaft 21 and a driving shaft 22 are provided on a table face 20a of the moving frame 20 for movably holding a lens frame 30 in a second detection (Y-direction shown by a symbol Y) and substantially parallel to the table face 20a of the moving frame 20. A piezoelectric device 23 serving as an actuator in the Y-direction is connected with the driving shaft 22.

Two sets of hangers 24 which are to be hung with the trailing shaft 11 of the secured frame 10 and a bearing 25 which is to be elastically engaged with the driving shaft 12 are provided on the moving frame 20.

Similarly, two sets of hangers 34 which are to be hung with the trailing shaft 21 and a bearing 35 which is to be elastically engaged with the driving shaft 22 of the moving frame 20 are provided on a side wall 30a of tube shaped lens frame 30 for holding a correction lens 1.

Decks 31 and 32 are outwardly protruded from the side wall 30a of the lens frame 30 at positions facing the trailing shafts 11 of the secured frame 10 and the trailing shaft 21 of the moving frame 20 when the correction lens unit is assembled. Light emitting devices such as light emitting diodes 33x and 33y are respectively provided on the decks 31 and 32.

Furthermore, light receiving devices 14x and 14y are respectively provided at positions on the table 10a of the secured frame 10 facing the light emitting devices 33x and 33y at home positions when the correction lens unit is assembled.

The trailing shaft 21 of the moving frame 20 is inserted between protrusions 34a and 34b of the hangers 34 of the lens frame 30. The trailing shaft 11 of the secured frame 10 is inserted between protrusions 24a and 24b of the hangers 24 of the moving frame 20. Thus, the moving frame 20 is moved in the X-direction along the trailing shaft 11 and the driving shaft 12 by the piezoelectric device 13 on the secured frame 10. The lens frame 30 is moved in the Y-direction along the trailing shaft 21 and the driving shaft 22 by the piezoelectric device 23 on the moving frame 20. As a result, the correction lens 1 held on the lens frame 30 can be moved to a desired position in the X-direction and in the Y-direction.

Figure 2:
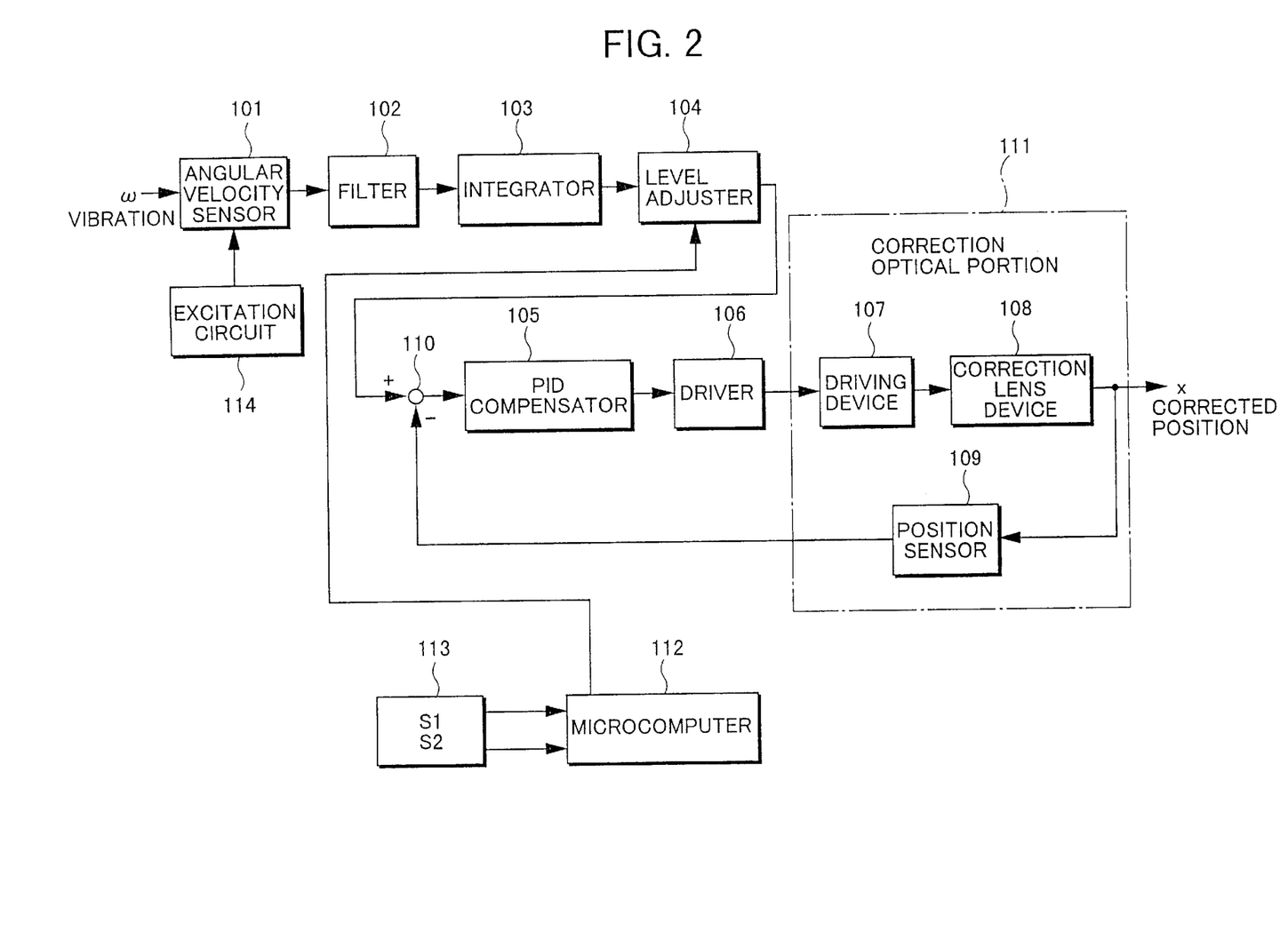
FIG. 2 is a block diagram showing a configuration of the embodiment.

A block diagram of a shake correction apparatus in this embodiment is shown in FIG. 2. Elements designated by numerals 101 to 107, 109, 110 and 114 in FIG. 2 configure a shake detection portion and a shake correction portion in the X-direction. A shake detection portion and a shake correction portion in the Y-direction have the same configuration as those. The movements of the image on the film plane in the X-direction and in the Y-direction shown in FIG. 1, which are perpendicular to each other and correspond to pitch and yaw against the optical axis of the taking lens, are corrected. The above-mentioned correction lens 1, lens frame 30 and moving frame 20 in FIG. 1 correspond to a correction lens device 108. Each of the piezoelectric devices 13 and 23 corresponds to a driving device 107.

An angular velocity sensor 101 detects an angular velocity in the X-direction and outputs an angular velocity signal due to camera shake. The angular velocity sensor 101 drives a piezoelectric device by using an excitation pulse signal having a excitation frequency fg generated by an excitation circuit 114. The angular velocity sensor 101 senses the angular velocity in the X-direction by using Coriolis force generated by excitation velocity and a rotation component of the shake.

The angular velocity signal of the angular velocity sensor 101 is inputted to a filter 102. The filter 102 includes a band-pass filter or a combination of a low-pass filter and a high-pass filter. In the following explanation, the filter 102 is described as the band-pass filter. Generally, the angular velocity signal of the angular velocity sensor 101 includes high frequency noise components due to a dark noise output of the angular velocity sensor, leakage component of the excitation pulse signal, mechanical vibration of mirror-up motion of the camera just before exposure of a film, and so on. Furthermore, the angular velocity signal of the angular velocity sensor 101 is an analogue signal. When the analogue signal of the angular velocity sensor 101 is converted to a digital signal, an aliasing noise occurs. Thus, the filter 102 removes the high frequency noise component, the aliasing noise, drift, offset, and so on from the angular velocity signal of the angular velocity sensor 101. A frequency range in which the shake correction effect can be obtained is defined by cutoff frequencies in high frequency side and in low frequency side of the filter 102.

An integrator 103 integrates the angular velocity signal passing through the filter 102 for converting an angular signal. A level adjuster 104 adjusts a level of the angular signal for converting to a control signal for controlling the position of the correction lens device 108 (hereinafter, abbreviated as position control signal). A moving quantity of the correction lens device 108 or a destination to which the correction lens device 108 is moved is calculated by using the position control signal. The object level of the angular signal adjusted by of the level adjuster 104 is previously decided corresponding to a focal length of a taking lens system of the camera. A plurality of values of the object level are memorized in a memory of a microcomputer 112. The microcomputer 112 selects one value of the level and inputs the value to the level adjuster 104.

A correction optical portion 111 is configured by the correction lens device 108, the driving device 107, mechanical members for holding the driving device 107 and transmitting a driving force of the driving device 107 to the correction lens device 108, and a position sensor 109. The position of the correction lens device 108 in the X- direction which is perpendicular to an optical axis of the taking lens system is detected by the position sensor 109.

A PID compensator 105, a driver 106 for controlling the driving device 107, the driving device 107, the correction lens device 108, the position sensor 109 and a subtractor 110 configure a feedback loop. The subtractor 110 subtracts a signal corresponding to a detected position of the correction lens device 108 (hereinafter, abbreviated as detected position signal) of the position sensor 109 from the position control signal of the level adjuster 104. The PID compensator 105 executes one of proportional compensation (P-compensation), integral compensation (I-compensation) and differential compensation (D-compensation) for an output signal of the subtractor 110 in order to compensate a delay of transmission characteristic of the driving force of the driving device 107 to the correction lens device 108.

In the feedback control, the PID compensation is used. The differential compensation (D-compensation) is used for improving the reduction of the gain margin GM and the phase margin PM due to over-compensation by the proportional compensation and for increasing the stability of the feedback control. The integral compensation (I-compensation) is used for increasing the offset characteristic of the feedback control. The feedback control selectively using the combination of the P-compensation, I-compensation and D-compensation is called PID compensation.

A shutter release button 113 of the camera has a first switch Si and a second switch S2 respectively turning on when the shutter release button 113 is pushed corresponding to predetermined strokes. The first switch Si turns on when the shutter release button 113 is pushed about half of the full stroke of the shutter release button 113. When the first switch S1 is turned on, the microcomputer 112 starts a sequence for preparing the exposure such as measurement of luminance of an object, focusing of the taking lens system on the object and the shake correction operation. The second switch S2 is turned on when the shutter release button 113 is fully pushed down. When the second switch S2 is turned on, the microcomputer 112 starts a sequence for the exposure such as mirror-up/down motion, moving of the aperture of the taking lens system, opening and closing of a shutter and a film winding by one frame.

Figure 3:
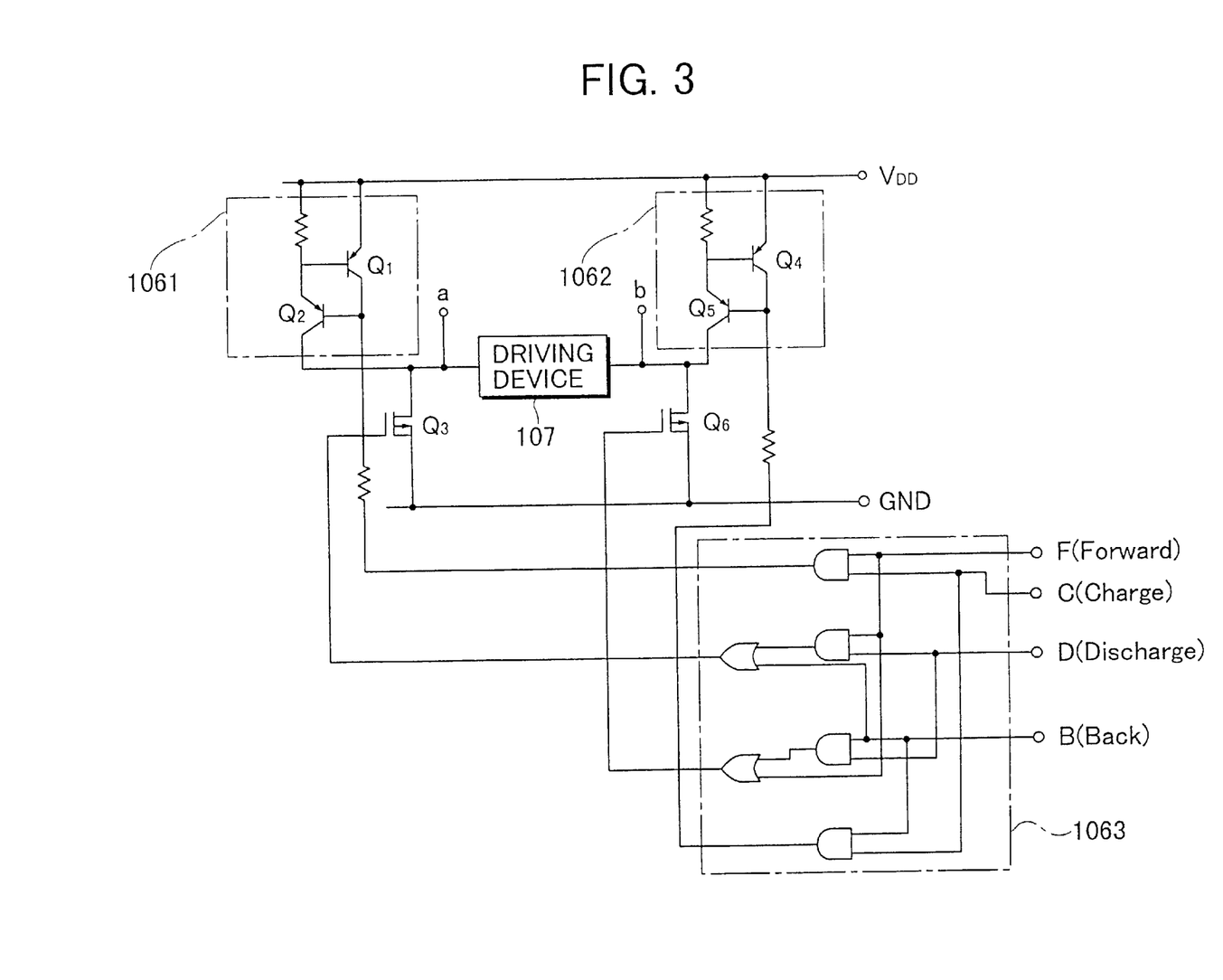
FIG. 3 is a circuit diagram of a driver in the embodiment.

An example of a configuration of the driver 106 for controlling the driving device 107 by a pulse width modulation control (PWM control) is shown in FIG. 3. A pair of constant-current circuits 1061 and 1062 which are respectively connected between a power source $V_{DD}$ and terminals "a" and "b" of the driving device 107 for charging the driving device 107. The constant-current circuit 1061 is configured by transistors Q1 and Q2, and so on. The constant- current circuit 1062 is configured by transistors Q4 and Q5, and so on. Furthermore, transistors Q3 and Q6 are respectively connected between the terminals "a" and "b" of the driving device 107 and the ground (GND) for discharging the charge of the driving device 107.

Figure 4A:
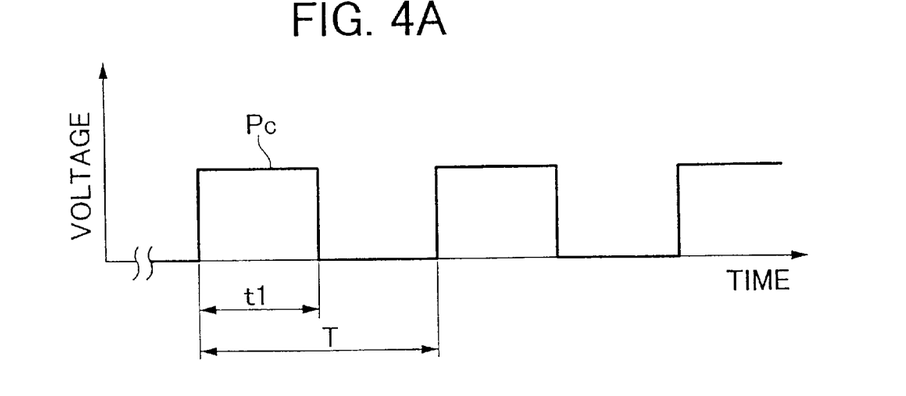
FIG. 4A is a timing chart showing changes of voltage at a terminal C in the circuit shown in FIG. 3.
Figure 4B:
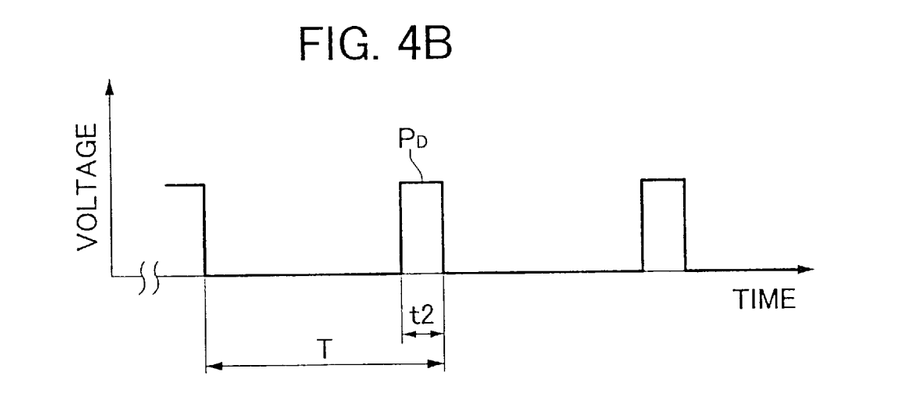
FIG. 4B is a timing chart showing change of voltage at a terminal D in the circuit shown in FIG. 3.

Signal lines from a logic circuit 1063 are respectively connected to the constant-current circuits 1061 and 1062, and the transistors Q3 and Q6. The logic circuit 1063 has four input terminals F, C, D and B. The terminals F and B are provided for controlling the moving direction of the correction lens device 108. Polarity of the terminals F and B are changed corresponding to the moving direction of the correction lens device 108. That is, when a high level voltage is applied to one of the terminals F and B, a low level voltage is applied to the other. The terminal C is provided to be inputted charge start pulses $P_C$ (see FIG. 4A) for making the constant-current circuits 1061 and 1062 start to charge operation of the driving device 107. The terminal D is provided to be inputted discharge start pulses $P_D$ (see FIG. 4B) for making the transistors Q3 and Q6 turn on for discharging the charge of the driving device 107. The charge start pulses $P_C$ and the discharge start pulses $P_D$ are repeatedly generated with a predetermined time period T and alternatively inputted to the terminal C or D.

When the charge start pulse Pc is applied to the terminal C (time period t1 in FIG. 4A), one of the constant-current circuit 1061 or 1062 to which the high level voltage is applied through the terminals F or B starts the charge operation. A current having a predetermined constant value flows to the terminal "a" or "b" of the driving device 107 from the power source $V_{DD}$. Potential of the driving device 107 linearly increases corresponding to the increase of electric charge (see FIG. 4C). Subsequently, when the discharge start pulse $P_D$ is applied to the terminal D (time period t2 in FIG. 4B), the corresponding transistor Q3 or Q6 turns on, and the electric charge of the driving device 107 is discharged. Thus, the potential of the driving device 107 is decreased to the ground level.

Figure 4C:
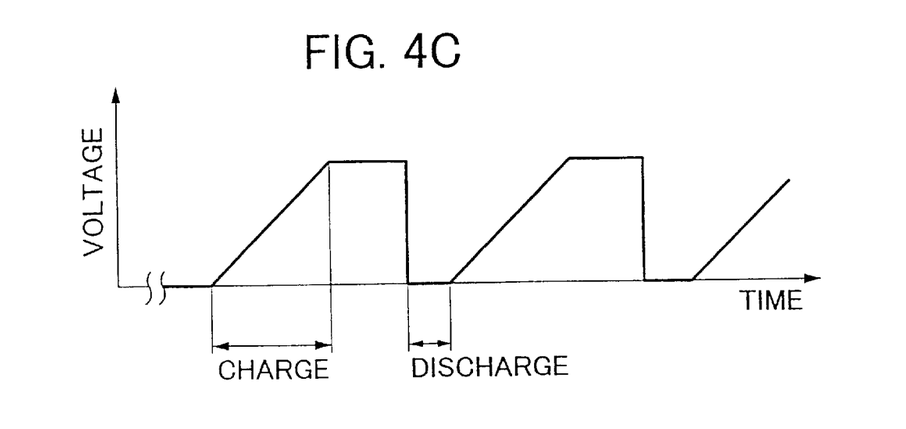
FIG. 4C is a timing chart showing a driving signal for a driving device in the embodiment.

In the case of moving the correction lens device 108 forwardly, the high level voltage is applied to the terminal F, and the low level voltage is applied to the terminal B. When the charge start pulse $P_C$ is inputted to the terminal C under the condition, the constant-current circuit 1061 is activated for the time period t1. As shown in FIG. 4C, the potential at the terminal "a" of the driving device 107 linearly increases while the time period t1, and maintains the highest level after the time period t1. Subsequently, when the discharge start pulse PD is inputted to the terminal D, the transistor Q3 turns on and the electric charge of the driving device 107 is discharged. Thus, the potential at the terminal "a" of the driving device 107 is decreased to the ground level (GND).

Driving control for the correction lens device 108 is executed by adjusting the potential at the terminals "a" or "b" of the driving device 107. The potential at the terminals "a" or "b" of the driving device 107 can be controlled by changing the width of the charge start pulse $P_C$ corresponding to the time period $t_1$ in FIG. 4A. Alternatively, the potential at the terminals "a" or "b" of the driving device 107 can be controlled by expanding and contracting the time period T (or changing the timing of the discharge start pulse t2). Alternatively, it is possible that both of the widths of the charge start pulse $P_C$ and the discharge start pulse $P_D$ corresponding to the time periods t1 and t2 are changed (frequency control).

When the driving device 107 is not driven, the voltage of the signal inputted to the terminal C or the potential of the terminal C is fixed at the low level. At this time, the voltage of the signal inputted to the terminal D or the potential of the terminal D can be fixed at the low level.

A control of the embodiment is described. As mentioned above, two angular velocity sensors 101 are used. In order to prevent an interference of the vibrations respectively having excitation frequencies fg1 and fg2 corresponding to the excitation pulse signals for exciting the angular velocity sensing portions of two angular velocity sensors 101, it is necessary not only to select the excitation frequency fg1 which is not equal to the excitation frequency fg2, but also to give a difference fd (fd=|fg1−fg2|) which is about 2 kHz between the excitation frequencies fg1 and fg2. On the other hand, the driving frequency fp of the driving devices 107 is commonly used.

In order to cutoff signals having fundamental frequency and harmonics of the excitation frequencies fg1 and fg2 of the angular velocity sensors 101 and the driving frequency fp of the driving devices 107, the cutoff frequency fc in the high frequency side of the filter 102 is selected to satisfy relations of fc<fg1, fc<fg2 and fc<fp. Furthermore, in this embodiment, in order to cutoff all beat signals fb1 and fb2, the cutoff frequency fc is selected to satisfy the following formulae (2).

$$Fc<fb1=|m1\cdot fg1-n1\cdot fp|$$

and $$Fc<fb2=|m2\cdot fg2-n2\cdot fp| \quad (2)$$

Hereupon, the symbols m1, m2, n1 and n2 are respectively optional positive integers equal to or larger than one (m1, m2, n1, n2 $\geq$ 1). When m1, m2, n1, n2 $\geq$ 2, the symbols m1, m2, n1 and n2 respectively designate the orders of the harmonic of the vibrations having the frequencies fg1, fg2 and fp.

Figure 5A:
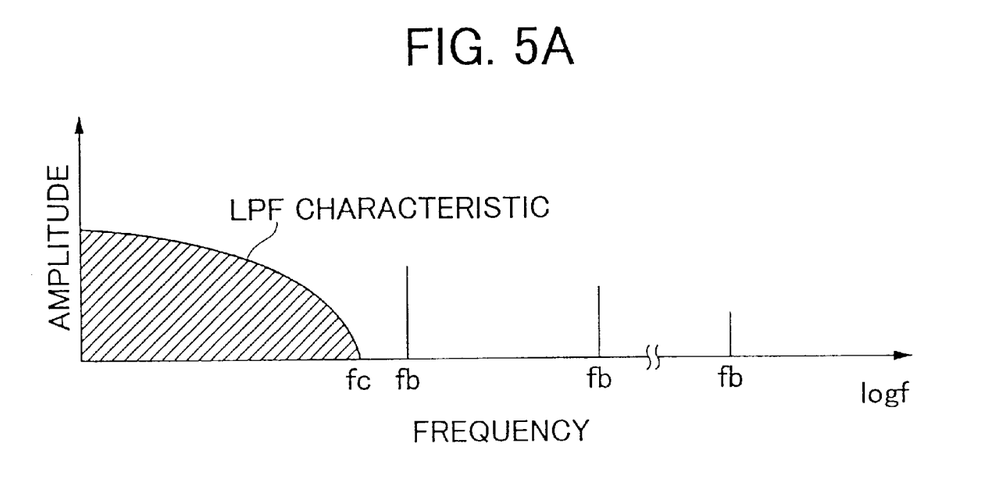
FIG. 5A is a graph showing a relation between cutoff characteristic of a low-pass filter and frequencies fb of beat signals in the embodiment.
Figure 5B:
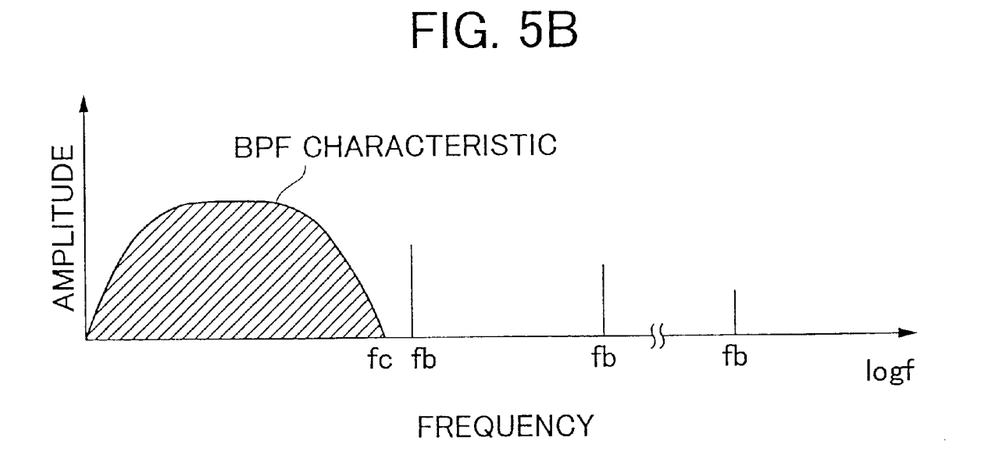
FIG. 5B is a graph showing a relation between cutoff characteristic of a band-pass filter and frequencies fb of beat signals in the embodiment.

A relation between the cutoff characteristic of the low-pass filter and the beat signals fb is shown in FIG. 5A, and a relation between the cutoff characteristic of the band-pass filter and the beat signals fb is shown in FIG. 5B. As shown by hatched regions in the figures, it is preferable that the beat signals fb are not included in the hatched regions which show the signals passing through the low-pass filter (LPF) or the band-pass filter (BPF).

As can be found from the above-mentioned formulae (2), the lower the cut-off frequency fc in the high frequency side of the filter 102 is, the higher the effect for removing the noise becomes. That is, the resolution in the effect of the shake correction increases. On the contrary, delay in the transmission of the signals increases, so that it affects the frequency characteristic in the shake correction effect. The cutoff frequency fc is selected in consideration of these opposite characteristics.

Furthermore, the lower the order of the harmonics in the formulae (2) is, the higher the level of the amplitude of the harmonics tends to be. The interference of the vibration having the driving frequency fp due to the driving of the driving device 107 and the vibration having the excitation frequency fg1 or fg2 due to the vibration of the angular velocity sensing portion of the angular velocity sensor 101 should be taken into consideration. Thus, the frequencies fc, fg1, fg2 and fp are selected so as to conclude the formulae (2) with respect to the values m and n in lower order.

An example of selecting the frequency fp is considered under setting the frequencies fc=300 Hz, fg1=25 kHz and fg2=26.5 kHz (fd=1.5 kHz) as fixed values. The frequency fp is assumed to be 50.1 kHz, the frequencies fb1 and fb2 of the beat signals with respect to the zeroth to tenth order of the harmonic are recited in tables 1 to 4.

The table 1 shows the values of m1·fg1 and m2·fg2 corresponding to the values of m1 and m2.

TABLE 1

| m1 and m2 | m1 · fg1 (Hz) | m2 · fg2(Hz) |
|---|---|---|
| 1 | 25,000 | 26,500 |
| 2 | 50,000 | 53,000 |
| 3 | 75,000 | 79,500 |
| 4 | 100,000 | 106,000 |
| 5 | 125,000 | 135,200 |
| 6 | 150,000 | 159,000 |
| 7 | 175,000 | 185,500 |
| 8 | 200,000 | 212,000 |
| 9 | 225,000 | 238,500 |
| 10 | 250,000 | 265,000 |

The table 2 shows the values of nx·fp (x=1,2) corresponding to the values of n1 and n2.

TABLE 2

| n1 and n2 | nx · fp(Hz) |
|---|---|
| 1 | 50,100 |
| 2 | 100,200 |
| 3 | 150,300 |
| 4 | 200,400 |
| 5 | 250,500 |
| 6 | 300,600 |
| 7 | 350,700 |
| 8 | 400,800 |
| 9 | 450,900 |
| 10 | 501,000 |

The table 3 shows the values of fb1 corresponding to the values of m1 and n1.

TABLE 3

| m1 and n1 | | fb1(Hz) |
|---|---|---|
| m1 = 2, | n1 = 1 | 100 |
| m1 = 4, | n1 = 2 | 200 |
| m1 = 6, | n1 = 3 | 300 |
| m1 = 8, | n1 = 4 | 400 |
| m1 = 10, | n1 = 5 | 500 |
| m1 = 9, | n1 = 4 | 24,600 |
| m1 = 7, | n1 = 3 | 24,700 |
| m1 = 5, | n1 = 2 | 24,800 |
| m1 = 3, | n1 = 1 | 24,900 |
| m1 = 1, | n1 = 1 | 25,100 |

The table 4 shows the values of fb2 corresponding to the values of m2 and n2.

TABLE 4

| m2 and n2 | | fb2(Hz) |
|---|---|---|
| m2 = 2, | n2 = 1 | 2,900 |
| m2 = 4, | n2 = 2 | 5,800 |
| m2 = 6, | n2 = 3 | 8,700 |
| m2 = 8, | n2 = 4 | 11,600 |
| m2 = 9, | n2 = 5 | 12,000 |
| m2 = 10, | n2 = 5 | 14,500 |
| m2 = 7, | n2 = 4 | 14,900 |
| m2 = 5, | n2 = 3 | 17,800 |
| m2 = 3, | n2 = 2 | 20,700 |
| m2 = 1, | n2 = 1 | 23,600 |

As can be seen from the table 4, all the frequencies fb2 of the beat signals, which are generated by the interference of the vibration having the excitation frequency fg2 of the angular velocity sensor 101 and the vibration having the driving frequency fp of the driving device 107, are larger than the cutoff frequency fc of the filter 102. Thus, the beat signals are removed by the filtering operation, any problem may not occur.

On the contrary, as can be seen from the table 3, among the frequencies fb1 of the beat signals which are generated by the interference of the vibration having the excitation frequency fg1 of the angular velocity sensor 101 and the vibration having the driving frequency fp of the driving device 107, the frequency fb1=100 corresponding to the case of m1=2 and n1=1 is smaller than the cutoff frequency fc=300. Similarly, the frequency fb1=200 corresponding to the case of m1=4 and n1=2 is smaller than the cutoff frequency fc=300. Furthermore, the frequency fb1=300 corresponding to the case of m1=6 and n1=3 is equal to the cutoff frequency fc=300. In these cases, the beat signals can pass through the filter 102, so that the S/N of the output signal of the angular velocity sensor 101 reduces. It is found that the driving frequency fp=50.1 kHz is not suitable fp for driving the driving device 107.

Subsequently, the driving frequency fp of the driving device 107 is changed to be 51.0 kHz, and the frequencies fb1 and fb2 of the beat signals are obtained. The frequencies fb1 and fb2 of the beat signals with respect to the zeroth to tenth order of the harmonic are recited in tables 5 to 7. Since the values of m1·fg1 and m2·fg2 are the same as those shown in the table 1, the recitation of them are omitted.

The table 5 shows the values of nx·fp (x=1,2) corresponding to the values of n1 and n2.

TABLE 5

| n1 and n2 | nx · fp(Hz) |
|---|---|
| 1 | 51,000 |
| 2 | 102,000 |
| 3 | 153,000 |
| 4 | 204,000 |
| 5 | 255,000 |
| 6 | 306,000 |
| 7 | 357,000 |
| 8 | 408,000 |
| 9 | 459,000 |
| 10 | 510,000 |

The table 6 shows the values of fb1 corresponding to the values of m1 and n1.

TABLE 6

| m1 and n1 | | fb1(Hz) |
|---|---|---|
| m1 = 2, | n1 = 1 | 1,000 |
| m1 = 4, | n1 = 2 | 2,000 |
| m1 = 6, | n1 = 3 | 3,000 |
| m1 = 8, | n1 = 4 | 4,000 |
| m1 = 10, | n1 = 5 | 5,000 |
| m1 = 9, | n1 = 4 | 21,000 |
| m1 = 7, | n1 = 3 | 22,000 |
| m1 = 5, | n1 = 2 | 23,000 |
| m1 = 3, | n1 = 1 | 24,000 |
| m1 = 1, | n1 = 1 | 26,000 |

The table 7 shows the values of fb2 corresponding to the values of m2 and n2.

TABLE 7

| m2 and n2 | | fb2(Hz) |
|---|---|---|
| m2 = 2, | n2 = 1 | 2,000 |
| m2 = 4, | n2 = 2 | 4,000 |
| m2 = 6, | n2 = 3 | 6,000 |
| m2 = 8, | n2 = 4 | 8,000 |
| m2 = 10, | n2 = 5 | 10,000 |
| m2 = 9, | n2 = 5 | 16,500 |
| m2 = 7, | n2 = 4 | 18,500 |
| m2 = 5, | n2 = 3 | 20,500 |
| m2 = 3, | n2 = 2 | 22,500 |
| m2 = 1, | n2 = 1 | 24,500 |

As can be seen from the tables 6 and 7, all the frequencies fb1 and fb2 of the beat signals, which are generated by the interference of the vibration having the excitation frequencies fg1 and fg2 of the angular velocity sensor 101 and the vibration having the driving frequency fp of the driving device 107, are larger than the cutoff frequency fc of the filter 102. Thus, the beat signals are removed by the filtering operation, any problem may not occur.

Especially, the frequencies fb1 of the beat signals corresponding to the cases of m1=2 and n1=1, m1=4 and n1=2 and m1=6 and n1=3 respectively become 1,000 Hz, 2,000 Hz and 3,000 Hz which are larger than the cutoff frequency fc=300. The beat signals having these frequencies will be removed by the filter 102, so that the S/N of the output signal of the angular velocity sensor 101 may not be reduced. Accordingly, it is found that the driving frequency fp=51.0 kHz is suitable for driving the driving device 107.

When a plurality of vibration sources such as the driving devices 107 exist, it is preferable that a plurality of formulae similar to the above-mentioned formulae (2) should be formulated with respect to the excitation frequencies fg1 and fg2 of the angular velocity sensors 101 and the driving frequencies fp1, fp2, . . . of the driving devices 107, and so on, and the frequencies fg1, fg2, fp1, fp2, should be selected to satisfy the formulae.

When the feedback control of the correction lens device 108 is a sampling control having a sampling frequency fs, the driving signals applied to the driving devices 107 are renewed at intervals of a sampling time period 1/fs. Thus, a mechanical vibration having the same frequency as the sampling frequency fs occurs. Since the mechanical vibration having the frequency fs also interferes with the vibrations due to the excitation of the angular velocity sensing portions of the angular velocity sensors 101, the beat signals occur. In such a case, the excitation frequencies fg1 and fg2 of the angular velocity sensors 101, the driving frequency fp of the driving devices 107, the cutoff frequency fc of the filter 102 and the sampling frequency fs of the feedback control are selected to satisfy the following formulae (3) in which the frequency fp in the formulae (2) is replaced with the frequency fs.

$$fc < fb1 = |m3 \cdot fg1 - n3 \cdot fs|$$

and $$fc < fb2 = |m4 \cdot fg2 - n4 \cdot fs| \quad (3)$$

Hereupon, the symbols m3, m4, n3 and n4 are respectively optional positive integers equal to or larger than one (m3, m4, n3, n4≧1). When m3, m4, n3, n4≧2, the symbols m3, m4, n3 and n4 respectively designate the orders of the harmonics of the vibrations having the frequencies fg1, fg2 and fs.

When both of the mechanical vibration due to the driving of the driving devices 107 and the mechanical vibration due to the sampling control of the correction lens device 108 become problems, it is preferable that the above-mentioned formulae (3) should be concluded with consideration of only the sampling frequency fs which is smaller than the driving frequency fp, since there is a synchronized relation fp=b·fs (b is a positive integer equal to or large than one) between the driving frequency fp and the sampling frequency fs.

Figure 6:
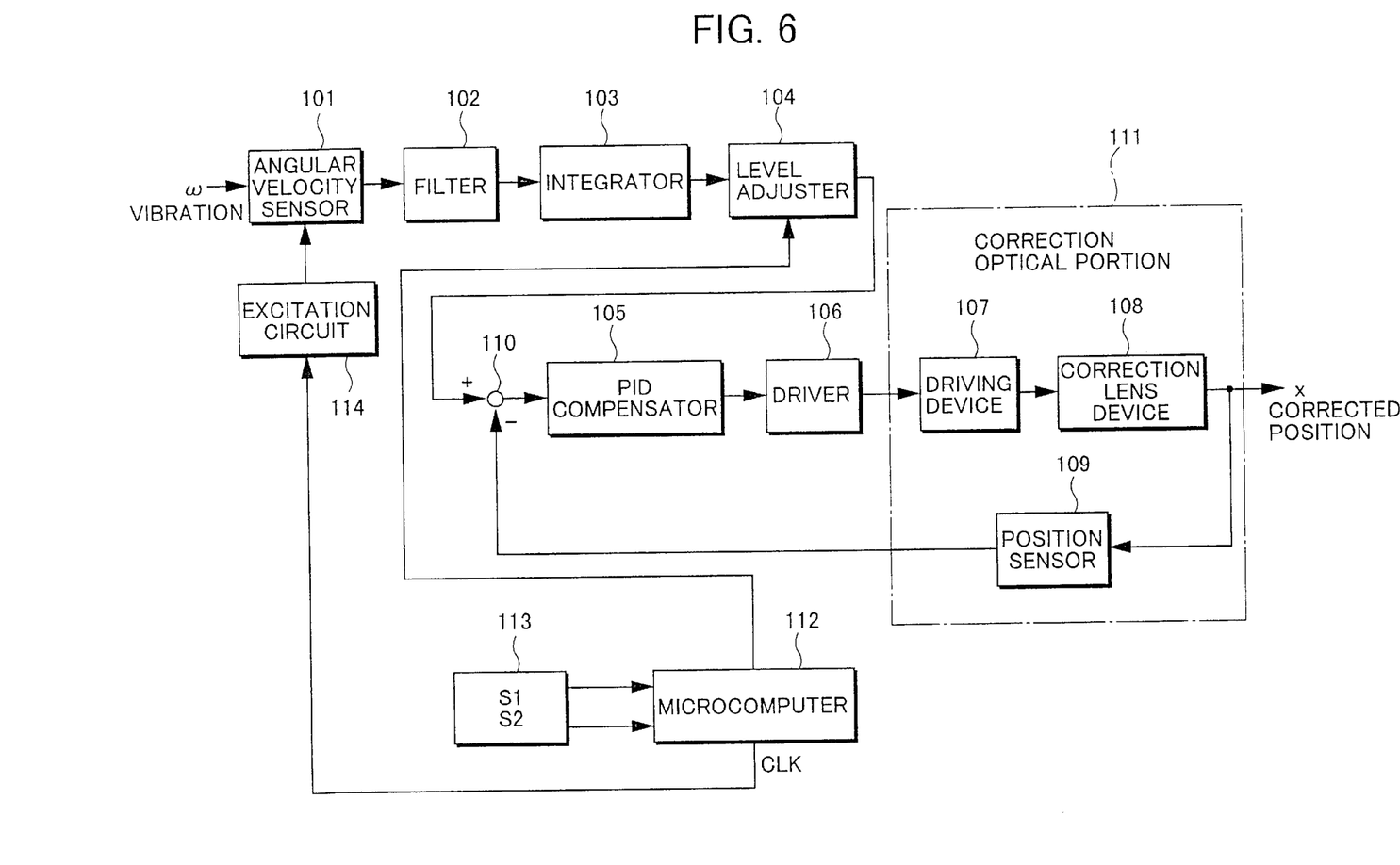
FIG. 6 is a block diagram showing a configuration of a modification of the embodiment.

A modification of the shake correction apparatus in this embodiment is described. A modified block diagram of the shake correction apparatus is shown in FIG. 6. Elements designated by the same numerals as those in FIG. 1 are substantially the same. In this modification, the feedback control of the correction lens device 108 is the sampling control. The angular velocity sensing portion of the angular velocity sensor 101 is excitingly vibrated by the excitation signal having a excitation frequency fg (including the frequencies fg1 and fg2) which is in synchronism with the sampling frequency fs of the sampling control. As can be seen from FIG. 6, a clock signal CLK from the microcomputer 112 is inputted to the excitation circuit 114.

As mentioned above, when the feedback control is the sampling control, the relation between the driving frequency fp of the driving devices 107 and the sampling frequency fs is fp=b·fs (b is a positive integer equal to or larger than one). Similarly, the excitation frequency fg=c·fs (c is a positive integer equal to or larger than one). Thus, the following equation (4) is concluded between the excitation frequency fg of the angular velocity sensor 101 and the driving frequency fp of the driving devices 107.

$$r \cdot fg = t \cdot fp \text{ or } fg/t = fp/r \quad (4)$$

Hereupon, the symbols r and t are respectively positive integers equal to or larger than one for showing the synchronized relation, and each of them is a prime number different than the other. When the equation (4) is substituted into the above-mentioned formulae (2), the following formula (5) can be formulated. With respect to the double sign in the formula (1), "−" is used.

$$fc < fb = \left| m - n \cdot \frac{r}{t} \right| \cdot fg = \left| m \cdot t - n \cdot r \right| \cdot \frac{fg}{t} \quad (5)$$

In the formula (5), |m·t·n·r| shows integers equal to or larger than zero (|m·t·n·r|≧0). Thus, the queue of the frequencies fb of the beat signals includes 0, fg/t, 2fg/t, 3fg/t . . . which are the values integer times as large as the frequency of fg/t or fp/r.

When the frequency fb of the beat signals is equal to zero, it means a direct current. The component due to the beat signals in the output signals of the angular velocity sensors 101 is considered as an offset signal. Thus, the component due to the beat signals are removed by an effect of removing the direct current component of the filter 102.

With respect to the cases that the frequencies fb are equal to or larger than the frequency fg/t or fp/r (fb≧fg/t or fb≧fp/r), the excitation frequency fg of the angular velocity sensors 101 and the driving frequency fp of the driving devices 107 are selected in a manner so that the frequency fg/t or fp/r becomes larger than the cutoff frequency fc in high frequency side of the filter 102, that is fc<fg/t=fp/r.

Figure 7:
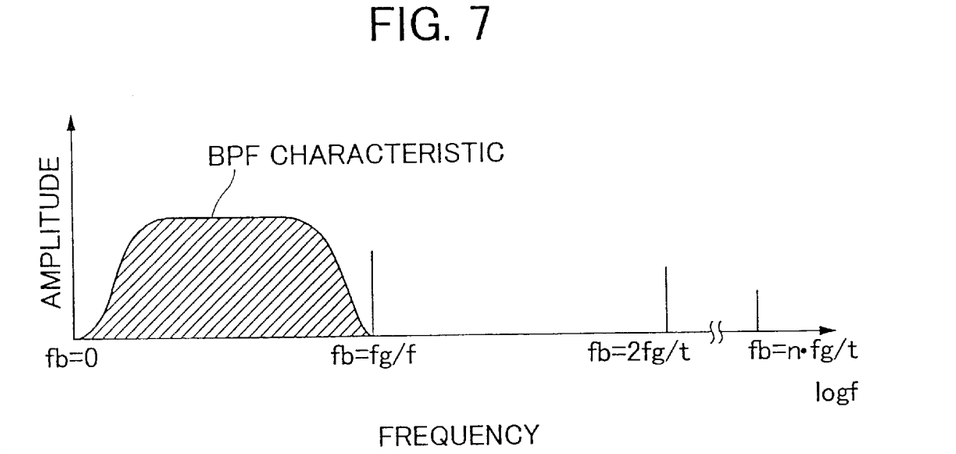
FIG. 7 is a graph showing a relation between cutoff characteristic of a band-pass filter and frequencies fb of beat signals in the modification of the embodiment.

A relation between the cutoff characteristic of the filter 102 and the beat signals having the frequency fb is shown in FIG. 7. As shown by a hatched region in FIG. 7, it is preferable that the beat signals fb should not be included in the region in which the signals can pass the filter 102.

In the above-mentioned description of the embodiment, the ultrasonic motor, especially the piezoelectric device, is used as the driving device 107. It, however, is not restricted by the description of the embodiment. When the DC motor, the voice coil motor or the stepping motor is driven by the PWM control, the same effect can be obtained. Furthermore, the equipment with shake correction apparatus in accordance with this invention is not restricted by the above-mentioned camera, it can be applied to another optical equipment such as a binocular, a movie camera, a video camera, and so on.

Furthermore, this invention is not restricted by the above-mentioned equipment with shake correction apparatus. The elements shown in FIG. 2 or 6 except the driving device 107 and the correction lens device 108 configures a shake sensor for sensing a shake in a predetermined direction. The shake sensor can be applied in any mechanical equipment in which the beat signals generated by the interference of the mechanical vibrations caused by e.g. auto-focus motor, zoom motor and so on should be removed.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An equipment with shake correction apparatus comprising at least one set of an angular velocity sensor for sensing an angular velocity due to a shake by using Coriolis force, a filter including a low-pass filter or a band-pass filter for filtering an output signal of the angular velocity sensor, and a driving device for driving a correction lens system for canceling the shake corresponding to the angular velocity; and satisfying a relation $$fc < |m \cdot fg - n \cdot fp|$$

wherein the symbol fg designates an excitation frequency of an excitation signal for excitingly vibrating an angular velocity detecting portion of the angular velocity sensor; the symbol fp designates a fundamental frequency of a mechanical vibration generated by driving of the driving device; the symbol fc designates a cutoff frequency of the low-pass filter or a cutoff frequency of the band-pass filter in high frequency; symbols m and n respectively designate optional positive integers equal to or larger than one, and when the symbol m or n is equal to or larger than two, it designates a harmonic of the frequency fg or fp.

2. The equipment with shake correction apparatus in accordance with claim 1, wherein the driving device is an ultrasonic motor driven by a driving signal having the frequency fp.

3. The equipment with shake correction apparatus in accordance with claim 1, wherein the driving device is driven by a pulse width modulation drive control which uses pulse signals having the frequency fp.

4. The equipment with shake correction apparatus in accordance with claim 1, wherein the driving device is driven by control signals which are renewed at intervals of a time period 1/fp.

5. The equipment with shake correction apparatus in accordance with claim 1, wherein the correction lens system moves a position of an image by decentering an optical axis of a taking lens.

6. An equipment with shake correction apparatus comprising at least one set of an angular velocity sensor for sensing an angular velocity due to a shake by using Coriolis force, a filter including a band-pass filter for filtering an output signal of the angular velocity sensor, and a driving device for driving a correction lens system for canceling the shake corresponding to the angular velocity; and satisfying relations $$fg/t=fp/r \text{ and } fc<fg/t=fp/r$$

wherein the symbol fg designates an excitation frequency of an excitation signal for excitingly vibrating an angular velocity detecting portion of the angular velocity sensor; the symbol fp designates a fundamental frequency of a mechanical vibration generated by driving of the driving device; the symbol fc designates a cutoff frequency of the band-pass filter in high frequency; the symbols r and t respectively designate positive integers equal to or larger than one showing a synchronous relation, wherein each of the symbols r and t is a prime number, r and t being different from each other.

7. The equipment with shake correction apparatus in accordance with claim 6, wherein the driving device is an ultrasonic motor driven by a driving signal having the frequency fp.

8. The equipment with shake correction apparatus in accordance with claim 6, wherein the driving device is driven by a pulse width modulation drive control which uses pulse signals having the frequency fp.

9. The equipment with shake correction apparatus in accordance with claim 6, wherein the driving device is driven by control signals which are renewed at intervals of a time period 1/fp.

10. The equipment with shake correction apparatus in accordance with claim 6, wherein the correction lens system moves a position of an image by decentering an optical axis of a taking lens.

11. A shake sensor comprising at least one set of an angular velocity sensor for sensing an angular velocity due to a shake by using Coriolis force, and a filter including a low-pass filter or a band-pass filter for filtering an output signal of the angular velocity sensor; and satisfying a relation $$fc<|m \cdot fg - n \cdot fp|$$

wherein the symbol fg designates an excitation frequency of an excitation signal for excitingly vibrating an angular velocity detecting portion of the angular velocity sensor; the symbol fp designates a frequency of a mechanical vibration due to a driving device included in an apparatus to which the shake sensor is applied; the symbol fc designates a cutoff frequency of the low-pass filter or a cutoff frequency of the band-pass filter in high frequency; symbols m and n respectively designate optional positive integers equal to or larger than one, and when the symbol m or n is equal to or larger than two it designates a harmonic of the frequency fg or fp.

12. The shake sensor in accordance with claim 11, wherein the driving device is an ultrasonic motor driven by a driving signal having the frequency fp.

13. An equipment with shake sensor comprising at least one set of an angular velocity sensor for sensing an angular velocity due to a shake by using Coriolis force, and a filter including a low-pass filter or a band-pass filter for filtering an output signal of the angular velocity sensor; and satisfying a relation $$fc<|m \cdot fg - n \cdot fp|$$

wherein the symbol fg designates an excitation frequency of an excitation signal for excitingly vibrating an angular velocity detecting portion of the angular velocity sensor; the symbol fp designates a frequency of a mechanical vibration due to a driving device; the symbol fc designates a cutoff frequency of the low-pass filter or a cutoff frequency of the band-pass filter in high frequency; symbols m and n respectively designate optional positive integers equal to or larger than one, and when the symbol m or n is equal to or larger than two it designates a harmonic of the frequency fg or fp.

14. The equipment with shake sensor in accordance with claim 13, wherein the driving device is an ultrasonic motor driven by a driving signal having the frequency fp.

* * * * *

UNITED STATES PATENT AND TRADEMARK OFFICE
CERTIFICATE OF CORRECTION

PATENT NO.   : 6,160,959
DATED        : December 12, 2000
INVENTOR(S)  : Kenji Mizumoto It is certified that error appears in the above-identified patent and that said Letters Patent is hereby corrected as shown below:

Column 12,
Line 60 (claim 1, line 19), after "designate", delete "optional".

Column 14,
Line 19 (claim 11, line 18), after "designate", delete "optional".
Line 40 (claim 13, line 17), after "designate", delete "optional".

Signed and Sealed this

Sixth Day of November, 2001

Attest:

NICHOLAS P. GODICI
Attesting Officer
Acting Director of the United States Patent and Trademark Office